D. BROOKS.
Underground Telegraph Lines.
No. 165,535. Patented July 13, 1875.
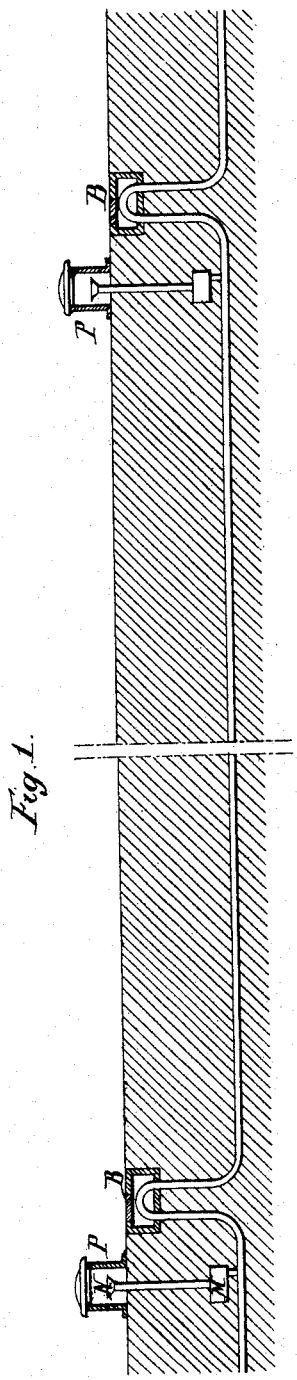
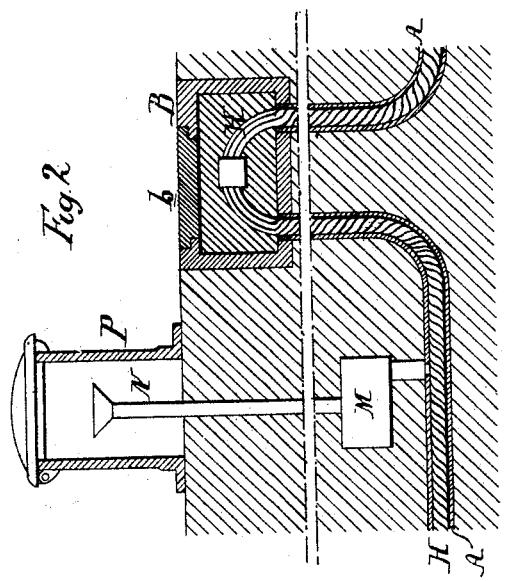
Witnesses,
Harry Smith
Hubert Howson
David Brooks
by his Attorneys,
Howson and Son

UNITED STATES PATENT OFFICE.

DAVID BROOKS, OF PHILADELPHIA, PENNSYLVANIA.

IMPROVEMENT IN UNDERGROUND-TELEGRAPH LINES.

Specification forming part of Letters Patent No. 165,535, dated July 13, 1875; application filed June 2, 1875.

*To all whom it may concern:*

Be it known that I, DAVID BROOKS, of Philadelphia, Pennsylvania, have invented an Improvement in Underground-Telegraph Conductors, of which the following is a specification:

The objects of my invention are to economically insulate underground-telegraph wires or cables, and to afford facilities for ascertaining approximately the point or points where there is an imperfect insulation or defective continuity of current.

These objects I attain in the manner which I will now proceed to describe, reference being had to the accompanying drawing, in which—

Figure 1 is a vertical section of part of a street or roadway, showing my improvements; Fig. 2 being a section, drawn to an enlarged scale, of part of Fig. 1.

In carrying out my invention I first clothe a wire with cotton, hemp, jute, or other cheap absorbent material. I then insulate one or more of these covered wires by saturating them with melted paraffine, this insulation being perfect until the wire or wires are bent. The paraffine, however, when solidified, being a non-elastic substance, the bending of the wires fractures the covering, or makes therein an opening or openings, which admit air or moisture; and this impairs or destroys the insulation. In order to obviate this difficulty I place the covered wire or cable of wires in a tube, and maintain within the latter a constant supply of paraffine-oil, which, surrounding the wire or cable, enters the cracks and crevices of the wounded covering, and thus preserves the insulation.

In the drawing, A represents a light iron pipe, of sufficiently large internal diameter to freely admit the cable H, the pipe being in lengths screwed or otherwise connected together, length after length being pushed over the cable, which, with the pipe, is laid in the ground at such a depth below the surface as to prevent the paraffine coating of the wires from being affected by changes of temperature. I prefer to make the pipe in sections, as shown, each section being bent upward at each end, and each bent end terminating in a box, B, which is embedded in the ground, and has a detachable cover or lid, *b*. The wires of the cable, where the latter passes through the box from one section of pipe to another, are exposed by removing the fibrous covering, or by stretching the wires apart within the box, which is then filled with melted pitch or other equivalent insulating material or composition. The length of each section of pipe between its bent ends I propose to make equal to the length of a city block; but the length may be varied according to circumstances.

Whenever, on rare occasions, it has been ascertained that there is a defect in the insulation or conductivity of the cable, it is important that the point where the defect occurs should be determined, so that no more of the pipe need be dug up than the section which contains the defective portion of the cable. The section in which the defect occurs can be easily ascertained by so far removing the insulating packing in the box B as to expose the wires of the cable to which the test is applied. Another advantage of the boxes B is the facility which they afford of making branch connections with the main cable.

With each section of pipe communicates a reservoir, M, containing a supply of comparatively heavy paraffine-oil or liquid paraffine, the reservoir being situated so far below the ground that its contents cannot be affected by changes of temperature. This supply of liquid paraffine is maintained under pressure, so that it will surround the wire or cable, enter any crevices or cracks in the same, and thus preserve the insulation as well as supply any deficiency of the liquid paraffine which may occur in the pipes through leakage or otherwise. I prefer to maintain the desired pressure within the reservoir M by means of a stand-pipe, N, which extends from the said reservoir to a point above the surface of the roadway, and terminates within a casing, P. This stand-pipe contains a supply of paraffine-oil of a lighter character than that contained in the reservoir M, so that its fluidity cannot be affected by the low temperature to which it must necessarily be exposed during the winter months. The kind of light paraffine-oil thus maintained in the stand-pipe not only causes the contents of the reservoir M to continuously surround the cable, but effectually excludes from the latter all air and moisture which might otherwise impair the insulation of the wires of the said cable.

When through leakage the supply of liquid paraffine or heavy paraffine-oil in the reservoir M becomes diminished, the said reservoir may be replenished after first pumping the lighter paraffine-oil from the stand-pipe.

Although I have alluded to paraffine as a material wherewith to cover the clothed wire or cable, to liquid paraffine as a medium for neutralizing any defect in the insulation of the covered wire or cable, and to a column of lighter paraffine-oil as a means of maintaining a constant pressure of the heavier oil within the pipes, other materials may be employed for the same purposes; for instance, the covered wire or cable may be coated with rosin, or with a composition of which rosin forms a part, a heavy rosin-oil may be contained in the reservoir M and liquid turpentine in the stand-pipe, or pressure may be maintained within the reservoir M by other means than a column of liquid.

Whatever substance the reservoir M contains, it should be of such a character that it will have an affinity for and not be repelled by the coating of the covered wire or cable, so that it can effectually aid the coating in performing its insulating duties.

Without confining myself, therefore, to any specific coating for the covered wire or cable, or to any specific liquid insulating material or composition, I claim as my invention—

1. An underground-telegraph wire or cable clothed with absorbent material, covered with insulating substance, and contained within a pipe, in combination with a liquid insulating medium maintained under pressure within the said pipe, all substantially as set forth.

2. An underground-telegraph wire or cable surrounded by pipes arranged in sections, each section being bent upward at the ends, as set forth, and terminating in a box or receptacle, B, for the purpose specified.

In testimony whereof I have signed my name to this specification in the presence of two subscribing witnesses.

DAVID BROOKS.

Witnesses:
HUBERT HOWSON,
HARRY SMITH.